Oct. 5, 1943.  H. E. MALONE ET AL  2,330,832
CONTROL MECHANISM
Filed May 12, 1941  4 Sheets-Sheet 1
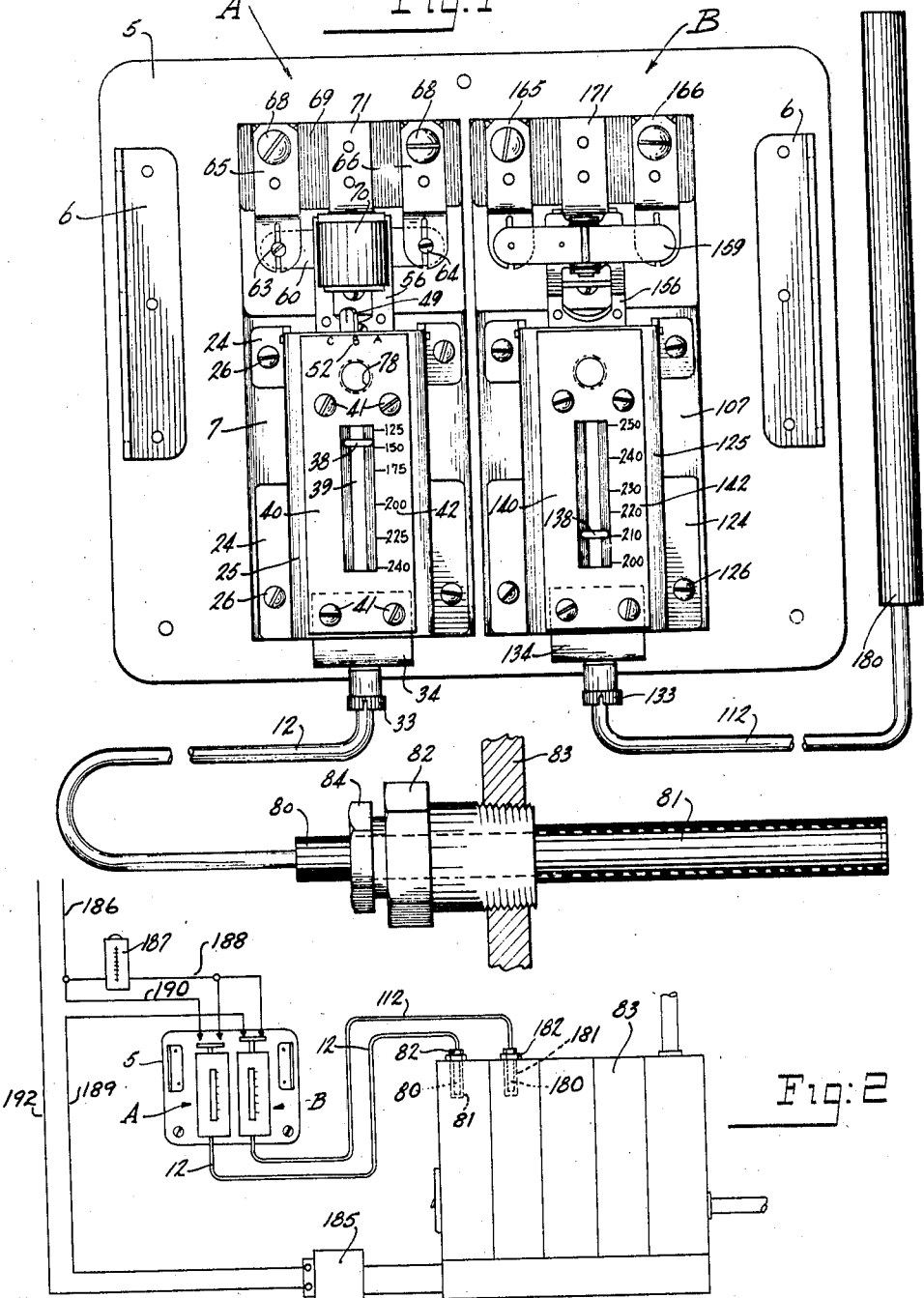
INVENTORS:
Homer E. Malone
Arthur F. Geisel
BY
ATTORNEY.

Oct. 5, 1943.   H. E. MALONE ET AL   2,330,832
CONTROL MECHANISM
Filed May 12, 1941   4 Sheets-Sheet 2
Fig:3
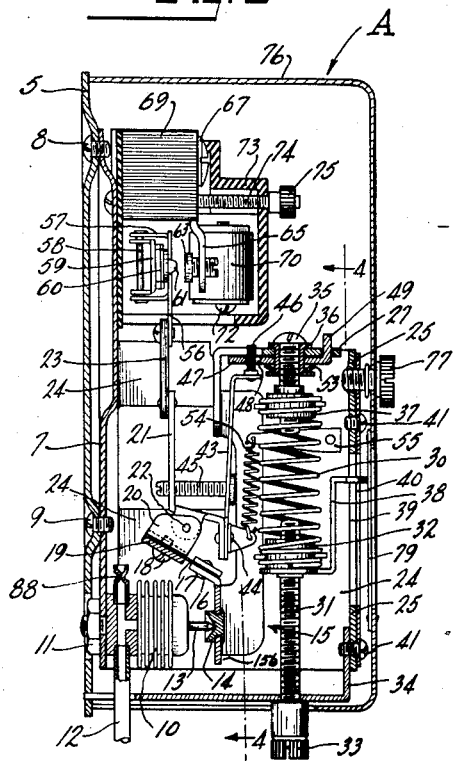
Fig:4
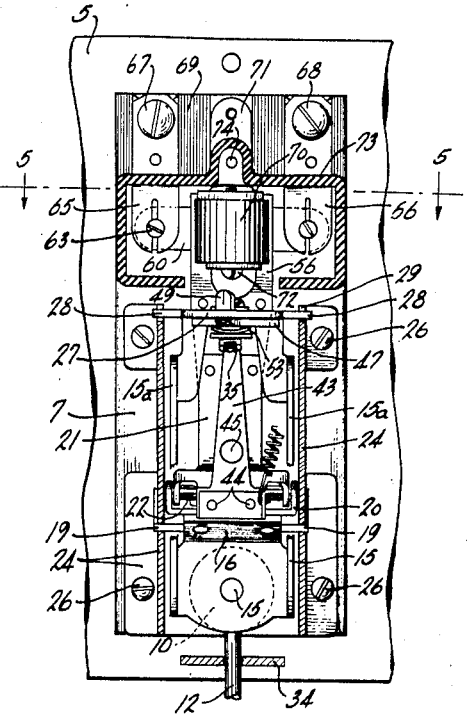
Fig:6
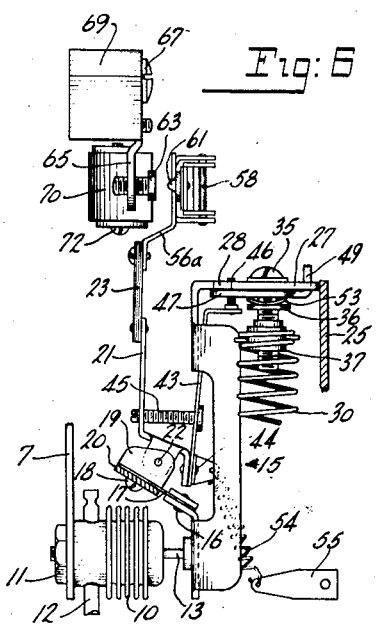
Fig:5
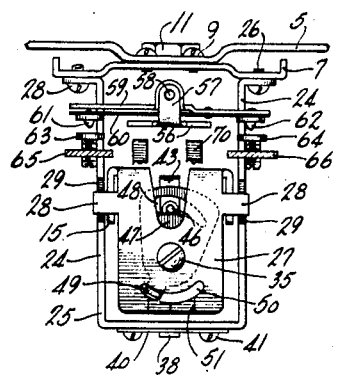
INVENTORS
Homer E. Malone
Arthur F. Geisel
BY
M. Tate ATTORNEY.

Oct. 5, 1943.  H. E. MALONE ET AL  2,330,832
CONTROL MECHANISM
Filed May 12, 1941   4 Sheets-Sheet 3
Fig: 7
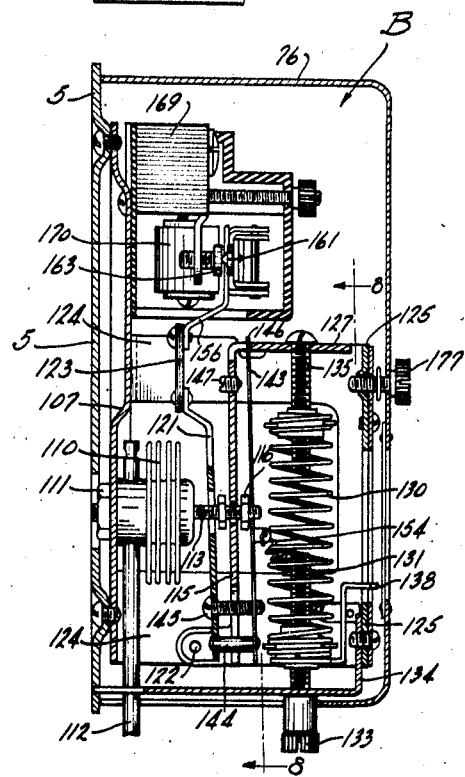
Fig: 8
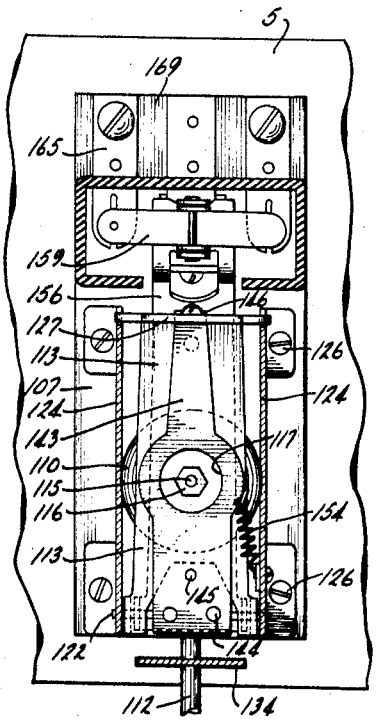
Fig: 9
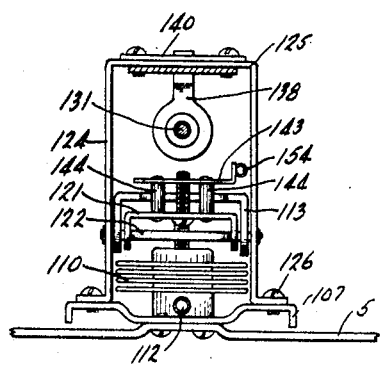
INVENTORS
Homer E. Malone
Arthur F. Geisel
BY
*M. Teet* ATTORNEY.

Oct. 5, 1943.       H. E. MALONE ET AL       2,330,832
CONTROL MECHANISM
Filed May 12, 1941        4 Sheets-Sheet 4
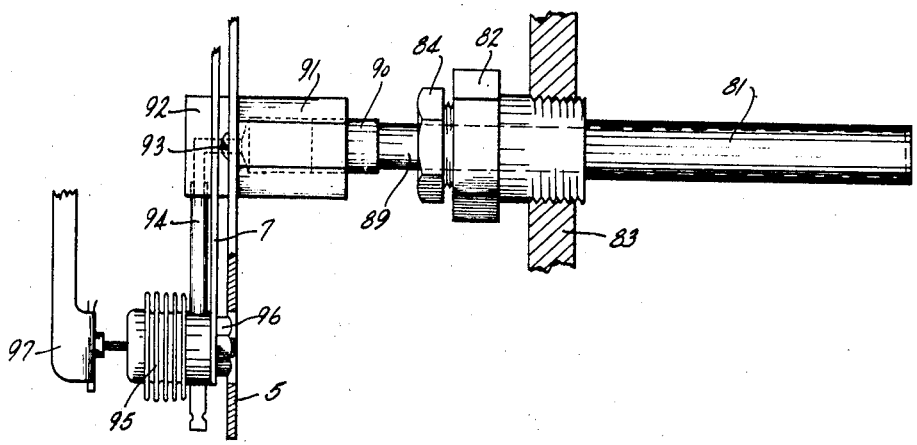
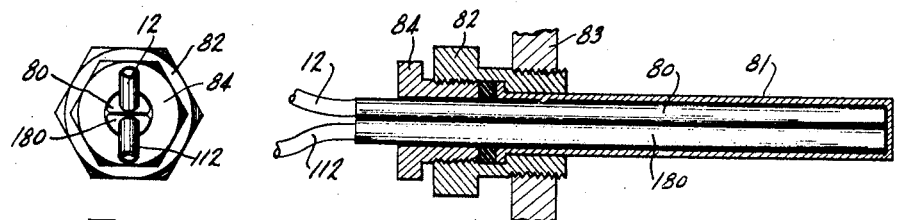
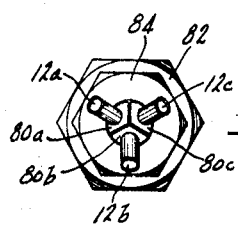
INVENTOR.
Homer E. Malone
Arthur F. Geisel
BY
ATTORNEY.

Patented Oct. 5, 1943

2,330,832

UNITED STATES PATENT OFFICE 2,330,832

CONTROL MECHANISM

Homer E. Malone and Arthur F. Geisel, Milwaukee, Wis., assignors to Perfex Corporation, Milwaukee, Wis., a corporation of Wisconsin Application May 12, 1941, Serial No. 393,058

22 Claims. (Cl. 200—83)

The present invention relates in general to control mechanisms and more particularly to control mechanisms for automatically controlling the operation of a temperature changing means such as a heating system.

It is an object of the invention to provide a new and improved control mechanism for controlling the operation of a heating system in a more reliable and satisfactory manner.

A further object is to combine the various controlling devices formerly required to operate a heating system into a single unitary control mechanism whereby the installation, adjustment, and elements constituting the control mechanism are considerably simplified and the maintenance is also facilitated.

Another object of the invention is to provide a control mechanism including a first control device arranged to start and stop the operation of the heating plant to maintain the same within predetermined minimum temperature values, together with a second control device arranged to stop the operation of the heating plant at a maximum temperature value in case the first control device fails to operate properly.

An additional object is to provide an arrangement such as above pointed out in which a safety means is incorporated in the second control device which functions to stop the operation of the heating plant in case the second control device becomes disabled.

Another object of the invention is to provide a new and improved temperature or pressure control device having improved operating characteristics and more accurate and simplified adjusting and calibrating means.

A still further object comprehends a control device having improved switching mechanism and more reliable and accurate means for actuating the same, together with a more compact and simplified arrangement of the various elements.

The foregoing and other objects and advantages of the invention not specifically enumerated reside in certain novel features of construction, arrangement and combination of the various parts and elements which will be hereinafter more fully described, illustrated in detail in the accompanying drawings, and particularly pointed out in the claims.

In the drawings:

Fig. 1 illustrates a top view of the control mechanism of the invention with the cover removed therefrom;

Fig. 2 is a diagrammatic illustration of a heating plant showing an application of the control mechanism of the invention;

Fig. 3 is a side view of the control device, partially in section;

Fig. 4 is a top view partially in section and taken generally along the lines 4—4 of Fig. 3;

Fig. 5 is a top view taken along the line 5—5 of Fig. 4;

Fig. 6 is a fragmentary view showing the essential operating elements of the control device;

Fig. 7 is a side view illustrating in partial cross-section another control element of the control mechanism;

Fig. 8 is a top plan view partially in cross-section and taken generally along the line 8—8 of Fig. 7;

Fig. 9 is a bottom end view of the device of Fig. 8;

Fig. 10 is a view of a fragmentary portion of a modified form of control device showing its application;

Fig. 11 is a cross-sectional view showing a pair of temperature bulbs associated with a single mounting support;

Fig. 12 is an end view of Fig. 11; while

Fig. 13 illustrates an end view similar to Fig. 12 in which three temperature bulbs are associated with a single supporting well.

The invention in its preferred form is illustrated generally in Fig. 1 and comprises a control mechanism including a first control element or device indicated generally at A, and a second control element or device indicated generally at B, both of said devices being associated with one another and adapted for unitary mounting and arrangement. As indicated generally in Fig. 2 the control mechanism of Fig. 1 in its broad aspects is arranged to control the operation of a temperature changing means diagrammatically illustrated, the general function of the control device A being to control the starting and stopping of the temperature changing means such as a heating plant within predetermined minimum temperature values, while the control device B is preferably arranged to stop the operation of the heating plant when predetermined maximum temperature conditions or excessive temperatures are produced by the heating plant. The devices A and B therefore mutually control the operation of the heating plant.

The control devices A and B are both mounted together upon a single wall mounting plate or support 5 in close proximity to one another. Suitable brackets 6 are fastened to the mounting plate 5 for the purpose of connecting the conduits carrying the incoming electrical conductors to the control mechanism. The control device A is removably supported upon the wall plate 5 by means of a sub-base 7 of the general configuration illustrated in Fig. 3. Screws 8 and 9 serve to secure the sub-base 7 to the mounting plate 5. Arranged upon the lower end of the sub-base 7 is a condition responsive member in the form of an expansible and collapsible bellows 10 which is provided with a threaded shank portion extending through the sub-base 7 upon which a clamping nut 11 is threaded to support the bellows 10 rigidly upon the sub-base. Connected with the shank portion of the bellows 10 and communicating with the interior of the bellows is a pipe or tube 12, the other end of which is connected to the heating plant as will be pointed out. The interiors of the bellows 10 and the tube 12 are filled with a suitable temperature sensitive fluid which has the capacity of expanding when subjected to a rise in temperature. Extending outwardly from the movable wall portion of the bellows 10 is an operating stem 13 provided with a pointed end which is adapted to engage a recessed portion of a stud member 14. The stud member 14 is suitably fastened to an operating lever 15 formed of two spaced, upwardly extending leg portions 15a joined at their lower ends by a lower supporting portion 15b. The supporting portion 15b of the operating lever 15 is clamped to one end of a thin spring hinge 17, the other end of which is secured by screws 18 to a transverse supporting bracket 19. The transverse bracket 19 in addition to serving to secure one end of the spring hinge 17 also carries a pivoting bracket member 20. This bracket member 20 in turn serves to pivotally support a switch actuating lever 21 by means of a pivot pin 22 extending through ear portions formed on the bracket 20 and switch actuating lever 21. The free movable end of switch actuating lever 21 carries an insulating switch supporting plate 23.

Partially surrounding and protecting the mechanism of the control device A is a U-shaped frame member 24 (Fig. 5) having side leg portions and which includes a top portion 25 arranged parallel with the sub-base 7. The frame member 24 is suitably secured at its leg portions to the sub-base 7 by a series of screws 26. The arrangement is such that when the frame member 24 is fastened in position upon the sub-base 7 the control mechanism which it encloses is protected in a manner to prevent tampering and damage to the mechanism. In addition the frame member also functions to support various elements of the mechanism. The transverse lever supporting member 19 is fixedly supported in the frame member 24 by means of end portions of the bracket 19 registering with slotted portions in the side walls of the frame member 24. By this means the members 19 and 20 are rigidly mounted in position and one end of the spring hinge is rigidly supported whereby the operating lever 15 may rotate about the spring hinge 17 as a pivot whenever the bellows 10 expands or contracts.

At its upper end the operating lever 15 is provided with a portion 27 joined to and arranged at right angles to the upwardly extending portions 15a, this portion 27 having oppositely positioned pairs of lugs 28 formed thereon as shown in Fig. 5, and which are adapted to ride in associated slotted portions 29 cut in the side walls of the frame member 24. The ends of slots 29 by engagement with the lugs 28 limit excessive movement of the operating lever 15 in one or both directions. The forward edge of the portion 27 of operating lever 15 may engage the underside of the top portion 25 of frame member 24 whenever the bellows 10 is in a contracted state, this serving as a stop for limiting clockwise movement of lever 15.

In order to adjust the particular temperature point at which the bellows 10 operates the operating lever 15, an adjusting spring 30 is provided, one end of which is connected to adjusting screw 31 by means of a spring connecting stud 32. The adjusting screw 31 is provided with an adjusting head portion 33 projecting from the bottom end of the control device A in a position where it is readily accessible for manipulation. The headed portion of adjusting screw 33 is adapted to bear against a plate member 34, one end of which registers with a slotted opening in the base member 5 and the other end of which is secured to the underside of the top portion 25 of frame 24. At its upper end the adjusting spring 30 is provided with a calibrating screw 35 for adjusting the spring tension. The screw 35 passes loosely through a sleeve member 36 arranged on the upper transverse end portion 27 of operating lever 15. The calibrating screw 35 also threads into a spring connector 37 upon which the other end of adjusting spring 30 is secured. At its lower end the spring 30 is provided with an adjustment indicating arm 38 which is suitably secured to the spring connector 32. The end of indicator arm 38 projects through a slot 39 cut in the wall of the top portion 25 of frame 24 as indicated more clearly in Fig. 1. An indicating plate 40 is arranged on the surface of the top portion 25 and is secured thereto by a series of screws 41, the screws 41 at the lower end of the device also serving to support one end of the plate member 34. Suitable temperature or pressure indicating indicia 42 are stamped upon the plate 40 and cooperate with the indicator 38 to indicate the setting of the instrument.

The adjustment of the adjusting spring 30 predetermines the temperature or pressure point at which the control device is to operate and in order to provide an adjustable differential suitable means are arranged upon the operating lever 15 for providing this function. This means includes a relatively stiff leaf spring blade 43, one end of which is secured by rivets 44 to a projecting end of the switch actuating lever 21 which end is arranged on the opposite side of the pivot point 22 of the lever 21. A calibrating or initial adjustment screw 45 connects the switch actuating lever 21 and the spring blade 43 and is threaded through the lever 21 with the head of the screw engaging one side of the spring blade 43. By turning this calibrating screw 45 the separation of lever 21 and spring blade 43 may be varied. At its upper end the spring blade 43 is provided with a pin 46 rigidly connected thereto which projects upwardly through an opening in the top portion 27 of operating lever 15. Arranged below the top portion 27 is a differential adjusting cam member 47 which is provided with a cam-shaped slotted opening 48, wider at one end than the other as shown in Fig. 5, and through which the pin 46 projects. The adjusting cam member 47 is also provided with an upwardly extending portion 49 passing through a circular slot 50 in the top portion 27, the element 49 providing a finger piece for enabling the differential adjustment of the control device to be made. The cam adjusting member 47 is pivoted for rotation by the finger piece 49 about the sleeve member 36 through which the calibrating screw 35 passes. Suitable indicia 51 (Fig. 5) is stamped upon the top surface of the portion 27 to provide means for indicating the position of the finger piece 49. The front upper surface of indicating plate 40 is also provided with stamped indicia 52 (Fig. 1) cooperating with a mark on the finger piece 49 so that the differential adjustment may be readily perceived from the front of the control device, the stamping 51 being in register with the indicia 52. In order that the setting of the differential cam member 47 may be maintained in the position in which it has been rotated, a spring washer 53 is provided which is placed on the sleeve member 36 and exerts slight frictional pressure against the adjusting member 47 for this purpose.

The arrangement of the foregoing differential elements is such that a variable amount of lost motion is provided for the pin 46 in slot 43 so that upon movement of the operating arm 15 by the bellows 10 this lost motion must first be taken up before an effective movement of the actuating lever 21 can take place. By rotating the finger piece 49 to any desired position the amount of lost motion is readily predetermined. As viewed in Fig. 5, should the finger piece 49 be rotated to the right, the pin 46 would register with the narrow part of slot 48 to provide a minimum amount of lost motion and therefore a small differential. In the position illustrated, the adjustment is at almost its maximum position to give a wide differential adjustment.

In order to hold the switch actuating lever 21 in the position illustrated in Fig. 3 in which the switching mechanism is in its open position, a biasing spring 54 is provided, one end of which is attached to a clip secured by rivet 44 on the end of switch arm 21, while the other end is suitably secured to a clip member 55 in turn fastened to the frame 24.

The movable portion of the switching mechanism of the controlling device A is supported on the end of insulating plate 23 by a flat iron member 56 which at its free end comprises a magnetic armature portion. The armature member 56 is provided with a pair of projecting ear portions 57 which carry between them a pivoting pin 58 for supporting the switching mechanism. The movable switching mechanism includes a rigid bridging bar 59 and a flexible leaf spring member 60 having one end secured to the rigid bar 59 and the other end free as shown in Fig. 5. The leaf spring 60 and the rigid bar are arranged parallel to one another. At its free end the leaf spring 60 is provided with a movable contact point 61 while the opposite end carries a second movable contact 62 which is securely riveted with the leaf spring 60 to the rigid bar 59. The movable contact points 61 and 62 are disposed in operative relationship to associated fixed contact studs 63 and 64 respectively, which are in turn supported in an adjustable manner from contact brackets 65 and 66 respectively. The contact brackets 65 and 66 are provided at their opposite ends with terminal screws 67 and 68 (Fig. 4) respectively, for the purpose of attachment of the incoming electrical wires. The contact brackets 65 and 66 are in turn supported as by screws from the top of an insulating block 69 suitably supported on the upper end of sub-base 7.

The switching mechanism of the control device is provided with snap action mechanism to insure positive and reliable operation of the mechanism. This snap action mechanism includes a U-shaped permanent magnet 70 suitably clamped by screw 72 to a bracket member 71 supported upon the insulating block 69. The pole ends of the magnet 70 are arranged in operative relationship to the armature bracket 56 as shown in Fig. 5. The contact switching arrangement is such that upon movement of the operating lever 21 to switch closing position, the movable contacts 61—62 engage the fixed contacts 63 and 64 respectively with snap action and electrically bridge the contacts by means of the leaf spring 60. The pull of the magnet 70 upon the armature 56 holds the contacts rigidly together in closed position to provide good contact operating characteristics. The precise manner in which the snap action of the contacts takes place is pointed out in detail in Patent No. 2,189,653, J. K. Luthe, February 6, 1940.

A suitable enclosing and protecting cover is provided for the contacts and switching mechanism which includes a box-like insulated casing 73 which is held in position by means of a screw 74 extending from insulating block 69 and a thumb nut 75 threaded on screw 74. A suitable enclosing metal cover 76 for protecting the complete control mechanism is arranged on the mounting plate 5 and is held in place by means of a screw 77 passing through the front of the cover and into threaded engagement with an opening 78 (Fig. 1) in the front portion 25 of frame 24. The front of the cover 76 is provided with a window opening 79 through which the scale plate 40 is visible to enable the adjusted position of indicator 38 to be readily viewed from the front of the instrument.

The control mechanism, including the control device A, is located at a position remote from the heating plant and is connected thereto by means of the tube 12. The tube 12 terminates in a cylindrical bulb member 80 sealed thereto which also contains temperature sensitive fluid so that the system including the bulb 80, tube 12 and the bellows 10 constitutes a closed system which functions to effect the operation of the control device A. The temperature bulb 80 is adapted to fit closely within a thin walled well 81 which is provided at one end with a threaded nipple 82 adapted to be screwed into the wall 83 of a boiler for example, as shown in Fig. 2. A gland nut 84 cooperating with suitable packing in the nipple 82 seals the temperature bulb 80 into the well 81. The system is filled with the temperature sensitive fluid from the small tube 88 on one side of the bellows which is pinched and then soldered after the fill is in.

Referring now to the operation of the control device A, the parts are shown in the positions they assume when the boiler temperature is above the setting of the control device. Thus the bellows 10 is in expanded condition causing movable contacts 61—62 to be disengaged from their associated fixed contacts 63—64. At this time the contacts are held in open position by the spring 54. If the boiler temperature now falls the bellows will contract, the biasing spring 30 causing operating lever 15 to rotate about its spring hinge 17 in a clockwise direction as seen in Fig. 3. During this clockwise motion of operating lever 15 the pin 46 of leaf spring 43 is carried along because of its engagement with the left hand side of slot 48 in differential adjusting member 47. Since the leaf spring 43 is directly coupled by means of aligning screw 45 with switch lever 21, the switch lever is likewise rotated in a clockwise direction about its pivot 22 carrying the movable portion of the switching mechanism toward engagement with the fixed portion. When the armature 56 comes within the influence of magnet 70 the contacts close with snap action. When this occurs the switch arm 21 is moved very quickly due to the force of the magnet, and the pin 46 moves freely to the right across the differential slot 48. The exact temperature point at which the control device again opens the contacts is readily adjustable by rotating the adjusting screw 33, thus applying more or less tension to the adjusting spring 30.

When the temperature of the boiler rises the temperature sensitive fluid in the system expands, causing the bellows to expand against the action of spring 30 and produce a counterclockwise rotation of the operating lever 15 about spring hinge 17. During this initial counter-clockwise movement of lever 15, the pin 46 remains stationary due to the pull of the magnet 70 upon armature 56 and the lost motion provided by slot 48. Upon continued counter-clockwise rotation of lever 15, the right hand edge of slot 48 engages pin 46 and thus further rotation of the lever causes the pin 46 to be carried to the left, this stressing the spring member 43 in a manner tending to cause counter-clockwise movement of switch lever 21. This tendency is initially resisted by the magnet 70 attracting armature 56. However upon continued movement of the lever 15 the armature 56 is pulled away from the magnet 70 and the contacts are opened with snap action which is assisted by the stresses built up in the various resilient parts of the control due to the pull of the magnet. When the contacts snap open the pin 46 engages the left hand end of slot 48 as viewed in Fig. 3 to take up the lost motion. The movement of the pin 46 within the slot 48 introduces a variable amount of lost motion which both enables the snap action to be performed and also determines the operating differential of the instrument.

Referring to Fig. 5, it will be noted that the inner surface of the slot 46 forms an arc of a circle having screw 35 as its center. Consequently rotation of the cam member 47 has no effect upon the position of the pin 46 when this pin is in engagement with the inner surface of the slot. In the embodiment of the invention shown in Fig. 3, movement of the switching mechanism to open position occurs only when this circular inner surface of the slot 47 engages the pin. Consequently adjustment of cam 47 has no effect upon the temperature value at which the contacts disengage, this being the cut-out point of the instrument. This cut-out point of the instrument may be varied by adjusting knob 33 which varies the tension of spring 30, the cut-out point being indicated by pointer 38 on scale 42. The outer surface of slot 48 in cam 47 it will be noted is not concentric with the inner surface, thus making the slot tapered so that the amount of lost motion of the pin 46 in the slot increases as the cam 47 is rotated clockwise as seen in Fig. 5. This lost motion determines the distance that the bellows 10 must expand in order to move the contacts from open position to closed position. Thus adjustment of cam 47 varies the operating differential of the instrument, the cam serving to vary only the cut-in point in providing this adjustment, this permitting positive adjustment of the cut-out point by rotation of knob 33.

In the event that the temperature to which the temperature sensitive liquid is subjected reaches a relatively high value the bellows 10 is prevented from expanding too far after operating the switching mechanism by the lugs 28 engaging the sides of slots 29, thereby stopping the movement of the bellows through the medium of the operating arm 15. The magnetic influence of the magnet 70 upon the armature 48 is readily varied by turning the adjusting contact studs 63 and 64 in or out, depending upon the amount of the contact differential desired. The engagement of the movable contacts with the fixed contacts prevents the actual engagement of the armature 56 with magnet 70, and since the magnet is located at a point between the contacts bridged by the rigid arm 59, these contacts are securely held together and not subjected to chattering movements when under the influence of vibrations.

Under certain circumstances it may be desirable to utilize a control device in a situation where it is desired that the device be actuated at a predetermined temperature to cause closing of the switching elements instead of opening them as has been described in connection with the control device of Fig. 3. Such a modification may readily be provided by a simple change in the contact structure. To produce this reverse action type of instrument it is merely necessary to reverse the mounting position of the magnet 70 as indicated in Fig. 6, reverse the positions of the fixed contact brackets 65 and 66 on the contact block 69 and substitute an offset type of armature bracket 56a in place of the straight bracket 56 in Fig. 3. With this simple change the mechanism will operate in a reverse acting manner.

Referring again to Fig. 1, the other portion of the control mechanism, designated generally as control device B, is mounted in juxtaposition to the control device A and supported in a similar manner on the mounting plate 5 from a subbase 107. The general features of the control device B, including the switching mechanism and the temperature regulating means, are generally similar to that described in connection with the control device A of Fig. 3. Only those features which differ from the control device A will be pointed out in detail. Referring now to Figs. 7, 8 and 9 of the drawings, the device B includes a bellows 110 secured by a nut 111 to the sub-base 107 and is connected to a tube 112 having access to the interior of the bellows 110. The bellows 110 in this instance has connected with its movable wall portion a threaded screw member 113. An operating lever 115 is provided which is adapted to be engaged at one side by an adjustable nut 116 threaded on the screw 113. The adjusting nut 116 is provided with projecting knife-edge portions engaging the side surface of the operating lever 115 and is at all times maintained in engagement therewith. A switch operating lever 121 is arranged parallel to the operating lever 115 and is pivoted by a pin 122 to the side frame member 124 by means of a pair of ears formed upon the lower end of lever 121. A similar pair of ear portions are formed on the lower end of operating lever 115 for the purpose of pivotally supporting the lever 115 on the pin 122. The frame member 124, which is held in place on the sub-base 107 by screws 126, encloses the operating mechanism of the control device and is provided on its front end with a transverse portion 125 which is arranged to serve at one end as an abutment for the turned out portion 127 of operating lever 115. The adjusting spring 130 is attached at one end to an adjusting screw 131 having its head 133 bearing against the plate member 134. The other end of spring 130 is adjustably held upon the calibrating screw 135 secured to the portion 127 of operating lever 115. The adjusting spring 130 is also provided with a pointer 138 which is adapted to be moved by rotation of screw 131 across the indicia 142 of plate 140.

A spring blade member 143 is arranged parallel to the levers 121 and 115 and at one end is supported from a pair of studs 144 which are rigidly supported from the lower end of switch arm 121. The upper end 146 of spring blade 143 extends through an opening in the operating lever 115 and abuts one side of the opening on the portion 127 of the operating lever. A differential adjusting screw 147 threaded through the upper end of operating lever 115 is arranged to engage the upper end 146 of spring blade 143 and determines the amount of lost motion of the spring blade 143 and therefore the operating differential of the device. A second screw 145 which has its head arranged to engage one side of switch arm 121 is threaded into the leaf spring 143 and by adjusting this screw the separation between switch lever 121 and leaf spring 143 may be varied to any desired amount in order to calibrate or align the position of the spring leaf 143. A large opening 117 in the spring blade 143 provides clearance for the screw member 113 and nut 116 when they are operated.

The spring blade 143 has attached near its midpoint, as shown, a biasing spring 154 for the purpose of holding the switching mechanism in one of the positions to which it is actuated.

The movable portion of the switching mechanism is carried on the movable end of the switch actuating lever 121 by means of an insulating plate 123. Attached to the other end of the insulating plate 123 is an armature bracket 156. The contact mechanism is similar to that described in connection with the control device A in that it includes a rigid bar 159 carrying the movable contacts, one of which 161 is illustrated, which is adapted to engage one of the fixed contacts 163. The fixed contact 163 is supported adjustably in a contact plate 165 supported from the insulating block 169 on the sub-base 107. The associated movable and fixed contacts are supported in a similar manner. The magnet 170 is arranged in a similar manner as pointed out in connection with Fig. 6. The cover 76 upon the base 5 also encloses the control device B and in addition is provided with a cover-holding screw 177 threadedly engaging the frame portion 125.

The control device B operates to open the switching contacts upon rise in temperature to a predetermined maximum which is adjustably determined by the setting of the pointer 138 upon the scale 142. When the boiler temperature rises to the setting of the instrument the bulb 180 of the control device B, which is arranged within the well 181 (Fig. 2) will be subjected to the temperature rise and as a result the temperature sensitive liquid within the bulb and the tube 112 will cause the bellows 110 to expand. This expansive movement is transmitted to the threaded stud 113 which is caused to move in a right hand direction as viewed in Fig. 7, causing the adjusting nut 116 to tend to move away from the operating lever 115. The tension of the adjusting spring 130, however, causes the operating lever 115 to closely follow the movement of the adjusting nut 116 on the stud 113. When the movement reaches a point in which the differential screw 147 engages the spring blade 143 the lost motion is taken up and the spring blade 143 is moved along with the lever 115. Due to the connection 145 of the spring blade 143 with the switch actuating lever 121 the switch lever is now moved so that the armature bracket 156 is caused to move away from the magnet 170. This action results in the switching contacts being opened with snap action due to the magnetic pull of magnet 170 on armature bracket 156 decreasing rapidly. Due to the tension of spring 154 now providing greater force than the magnet 170, the spring blade 143 disengages stud 147 and engages the right hand edge of the slot at portion 127. As in the case of device A, the lost motion provided by the slot determines the operating differential of the instrument. The stud 147 provides a factory adjustment of the operating differential. If a field differential adjustment is desired, this may be provided by utilizing an adjustable cam structure similar to the slotted differential cam 47 in Fig. 5.

When the temperature at bulb 180 falls an amount equal to the operating differential of the instrument the switching mechanism is closed. This is caused by the collapse of the bellows 110 which carries along the screw stud 113 and through the medium of adjusting nut 116 carries along the operating lever 115. The portion 127 of the operating lever moves away from the frame 125 carrying with it the end 146 of spring blade 143, thus causing counter-clockwise movement of switch arm 21, this moving the movable switch contacts toward the fixed contacts. Shortly thereafter the contacts of the mechanism close with snap action due to the attraction by magnet 170 of armature bracket 156 which also causes the spring blade 143 to move across the lost motion gap toward adjusting screw 147.

From the foregoing it is seen that in this control device B a somewhat different operation occurs than in the operation of the control device A in that the expansion of the bellows does not directly actuate the switch operating lever 115 but merely moves in a direction to release its influence thereon and permit the adjusting spring to exert its force upon the operating lever to operate the same. The purpose of this action will now be pointed out.

A control of the type to which this invention relates is of course dependent for operativeness upon the system formed of bellows, tube and bulb remaining fluid tight. If a leak should occur in the system due to damaging or a failure of some portion thereof, the control would become inoperative. Where the control is used as a high limit or safety control it is important that such failure result in shutting off the heating means. In other words, in order for the control to fail safe the control must be operated in the same direction upon failure as it would normally operate upon a rise in temperature. This result is provided by the arrangement which will now be described. A temperature sensitive fluid for the system comprising the bellows 110, pipe 112 and bulb 180 is selected having a pressure below atmospheric throughout the intended temperature range of the control. With this condition present should the system including the bellows, tube and bulb 180 be punctured the pressure within the bellows will increase from sub-atmospheric to atmospheric due to entry of air into the system, this causing the bellows 110 to expand independently of any temperature sensitive liquid which may remain in the system. This action of the bellows will cause the switching contacts to move to open position in the manner pointed out.

Referring now to Fig. 2, the application of the control assembly comprising devices A and B will be described. In this figure the boiler 83 is shown provided with a burner mechanism 185. A line wire 186 is connected to one side of a control device 187 which may be a room thermostat, the other side of this device being connected by a wire 188 to the switching mechanism of thermostat B which is in turn connected by wire 189 to burner 185 which is also connected to line wire 190. Thus the room thermostat 187 and boiler thermostat unit B are connected in series with the burner 185. The room thermostat serves to start and stop the burner for maintaining a constant room temperature and the device B serves to prevent the boiler temperature from rising above a predetermined maximum value. The device A has one side of its switch connected by wire 190 to line wire 186 and its other side connected with wire 188 by wire 191. Thus the device A is connected in parallel with the room thermostat 187 and in series with high limit control B. The device A serves as a low limit control and may be set to cause operation of the burner independently of the room thermostat 187 when the boiler temperature falls to a predetermined low value and to place the burner out of operation when the boiler temperature rises slightly above this value. It should be noted that in this control system the high limit control has two separate functions. Thus it prevents the burner when operated by the room thermostat from causing the boiler temperature to rise above a predetermined value. It also provides protection against failure of the low limit control A. If this control A should fail due to escape of the thermostat fill, the bellows 10 would collapse under the action of spring 30 thus closing the contacts and operating the burner. However, due to the high limit control being in series with the low limit control in the burner circuit, this circuit will be opened by the high limit control A when the boiler temperature rises to the setting of control A. Thus the system is protected against failure of the low limit control A by the high limit control B. Due to the high limit control B being arranged so as to break the burner circuit in event of escape of its thermostatic fill, and due to the control being arranged in the circuit so as to prevent operation of the burner by either the room thermostat 187 or the low limit thermosat A, an absolutely safe system is provided.

It should be noted that the devices A and B are substantially identical in exterior appearance, each having a control point adjusting arm at its lower end, a control point indicator on its front face, an enclosed switching mechanism at its top, and a thermostat tube extending from its lower end. This arrangement provides for ease in installing the control panel in the average type of installation. It also renders the control units A and B of the panel interchangeable, permitting various types of control panels to be easily made up of stock parts for different types of control systems. It should also be noted that in the devices A and B the various working parts are protected by the U-shaped base of each instrument which prevents tampering when the devices or control units are in place upon the panel.

The structure and mechanism of the control devices A and B are also applicable for use in the systems in which it may be desirable that the mechanism be mounted directly upon the boiler instead of being at a remote point as illustrated in Fig. 2. In an installation of this type, as illustrated in Fig. 10, the control device may be mounted directly upon the wall of the boiler 83, the well 81 projecting into the boiler and being held in position by means of the nut 82. The gland nut 84 in turn supports the temperature bulb 89 directly in the well 81 from the wall of the boiler 83. The bulb 89 is provided with an enlarged portion 90 which is adapted to interfit with a block 91 having a bore therein and within which the portion 90 is suitably soldered. The front end of the block 92 is arranged to be suitably secured as by screws 93 to the mounting plate 5 which supports the control mechanism such as A or B upon the associated sub-base 7. The block 91 is further provided with a bore into which a pipe or tube 94 is suitably connected. The opposite end of the tube 94 is connected to the interior of the bellows 95, the fixed wall of which is held by the nut 96 on sub-base 7. The movable wall of the bellows 95 is adapted to actuate the operating lever 97. With this arrangement the temperature sensitive fluid within the bulb 89, block 91 and tube 94 upon expansion actuates the bellows 95.

The control devices A or B may also be arranged for connection with a system in which they function as pressure controls, being actuated by air or steam pressure instead of a temperature sensitive fluid. To accomplish this the bulb 89 will simply be replaced with a direct line connection with either the steam or air pressure to actuate the bellows 95 directly.

A particular feature of the invention is disclosed in Figs. 11, 12 and 13 in which the control devices A and B may have their temperature bulbs 80 and 180 associated together in the same well 81 thereby reducing installation costs. In the arrangement illustrated in Fig. 11 the well 81 arranged within the boiler 83 is provided with a supporting nut 82 as well as a gland nut 84. The bulbs 80 and 180 instead of being tubular as illustrated in Fig. 1 are provided with flat side portions whereby they may be positioned together within the well 81. Both bulbs 80 and 180 are connected by their associated pipes 12 and 112 and are subjected to exactly the same temperature at one portion of the boiler 83 whereby more accurate temperature adjustment and operation of the control devices A and B may be brought about.

In the event that it is necessary to provide more than two temperature bulbs the arrangement illustrated in Fig. 13 may be used. In this arrangement three temperature bulbs, 80a, 80b and 80c are arranged together in a single well as illustrated. Each of the bulbs has connected thereto the associated tube 12a, 12b and 12c for connection with the associated control device.

While only the preferred embodiment of the invention has been disclosed, it will be apparent that various modifications and changes in the same may be made by those skilled in the art and it is therefore desired that the invention be limited only to the scope of the appended claims.

What is claimed is:

1. In a control device, a supporting base, an operating member, condition responsive means on said supporting base for actuating said operating member in one direction of movement, an adjusting spring for actuating said operating member in the opposite direction, a switch actuating member movable from one position to another by said operating member, a lost motion connecting means between said switch actuating member and said operating member whereby said switch actuating member is actuated after the lost motion is taken up by the movement of said operating member, and means including snap action means and biasing means effective to actuate said switch actuating member between its positions and to hold the switch actuating member in either of its positions, said lost motion connection including a spring blade member having one portion directly coupled with said switch actuating member and having another portion adapted to engage spaced apart portions of said operating member, said spring blade member being resilient and assisting in the snap action movement of said switch actuating member.

2. In a control device, a supporting base, an operating member comprising a lever portion arranged parallel to the supporting base and a portion arranged perpendicular thereto, condition responsive means on said supporting base arranged for movement perpendicular of said base for actuating said operating member in one direction perpendicular of said supporting base, an adjusting spring arranged parallel to said supporting base and having one end attached to the perpendicular portion of said operating member for actuating said operating member in the opposite direction, a switch actuating member arranged parallel to said supporting base, lost motion connecting means between said switch actuating member and the perpendicular portion of the operating member for determining the operating differential of said control device, and means arranged upon the perpendicular portion of said operating member for adjusting the amount of lost motion and therefore the operating differential of the control device.

3. A differential adjustment for a control device including an operating lever and a switch actuating lever together with a spring blade connected to said switch actuating lever, a lost motion connection between said spring blade and said operating lever, said lost motion connection comprising a cam member having an eccentric slot therein in which said spring blade is arranged to project, means for supporting said cam member for rotation on said operating lever whereby said eccentric slot may be rotated to vary the amount of lost motion of the spring blade in the eccentric slot, and means on said cam member for rotating said cam member and thereby adjusting the operating differential.

4. In a control device, a supporting base, a generally U-shaped frame member having its leg portions attached to said supporting base and having a front wall portion generally parallel to said base, a condition responsive device located within said frame member so as to be protected thereby, lever means actuated by the condition responsive device and pivoted to the leg portions of said frame member, said lever means comprising a first portion generally parallel to the supporting base and a second portion generally perpendicular to the supporting base, a control mechanism secured to the supporting base and actuated by the said lever means, differential adjustment means associated with the second portion of said lever means, control point adjusting means having a portion within said frame member and an operating member therefor located outside of said frame member, and adjustment indicating means cooperating with the front wall of said frame member for indicating the setting of the control point adjusting means.

5. In a control device, a supporting base, a generally U-shaped frame member having its leg portions attached to said supporting base and having a front wall portion generally parallel to said base, a condition responsive device located within said frame member so as to be protected thereby, lever means actuated by the condition responsive device and pivoted to the leg portions of said frame member, said lever means comprising a first portion generally parallel to the supporting base and a second portion generally perpendicular to the supporting base, a control mechanism secured to the supporting base and actuated by the first portion of said lever means, a biasing spring located within the frame member and extending generally parallel to the base, one end of said spring being attached to said second portion of the lever means, adjusting means for the biasing spring, and adjustment indicating means cooperating with the front wall portion of the frame member for indicating the setting of said adjusting means.

6. In a control device, a supporting base, a generally U-shaped frame member having its leg portions attached to said supporting base and having a front wall portion generally parallel to said base, a condition responsive device located within said frame member so as to be protected thereby, lever means actuated by the condition responsive device and pivoted to the leg portions of said frame member, said lever means comprising a first portion generally parallel to the supporting base and a second portion generally perpendicular to the supporting base, a control mechanism secured to the supporting base and actuated by the first portion of said lever means, a biasing spring located within the frame member and extending generally parallel to the base, one end of said spring being attached to said second portion of the lever means, a slot in the front wall portion of the frame member and extending parallel with the axis of said spring, adjusting means for moving the other end of the spring in a direction parallel with the slot, and an indicator attached to said other end of the spring and extending into said slot for indicating the setting of said adjusting means.

7. In a control device, a supporting base, a generally U-shaped frame member having its leg portions attached to said supporting base and having a front wall portion generally parallel to said base, a condition responsive device located within said frame member so as to be protected thereby, lever means actuated by the condition responsive device and pivoted to the leg portions of said frame member, said lever means comprising first and second portions, the first portion extending generally parallel to the supporting base and beyond one end of the frame member and the second portion extending generally perpendicular to the base and adjacent said end of the frame member, a control device mounted on said base and actuated by said first portion of the lever means, a biasing spring located within the frame member and extending generally parallel to the base, one end of the spring being attached to the second portion of the lever means, a slot in the front wall portion of the frame member and extending parallel with the axis of said spring, adjusting means for moving the other end of the spring in a direction parallel with the slot, and an indicator attached to said other end of the spring and extending into said slot for indicating the setting of said adjusting means.

8. In a control panel mechanism, the combination of, a control panel base having a housing therefor, a plurality of control devices mounted on said base, each control device comprising an elongated sub-base, a generally U-shaped frame member having its leg portions attached to the sub-base and having a front wall portion generally parallel to the sub-base, a condition responsive device located within the frame member so as to be protected thereby, lever means actuated by the condition responsive device and pivoted to the leg portions of the frame member, said lever means comprising first and second portions, the first portion extending generally parallel to the sub-base and beyond one end of the frame member and the second portion extending generally perpendicular to the sub-base and adjacent said one end of the frame member, a biasing spring located within the frame member and extending generally parallel to the sub-base, one end of the spring being attached to the second portion of the lever means, a slot in the front wall of the frame member and extending parallel with the axis of the spring, adjusting means extending from the lower end of the frame member through said housing for moving the other end of the spring axially thereof, and an indicator attached to the other end of the spring and extending into said slot, the housing being provided with window means opposite the front faces of the plurality of frame members whereby the settings of the adjustments may be viewed from the exterior of the housing.

9. In a control panel mechanism, the combination of, a control panel base, a plurality of control devices mounted on said base, each control device comprising an elongated sub-base, a pressure responsive device mounted at one end of the sub-base, a switching mechanism mounted at the other end of the sub-base and actuated by the pressure responsive device, control point adjustment mechanism mounted on the sub-base, and a control point indicator carried by the sub-base intermediate the pressure responsive device and switching mechanism, a housing mounted on the control panel base and covering said plurality of control devices, each control point adjustment mechanism including an adjusting member extending through the housing, and window means in a wall of the housing cooperating with the control point indicators to permit said control point indicators to be viewed from the exterior of the housing.

10. In a control mechanism for controlling a heater, the combination of, a control panel base having a housing therefor, a first sub-base mounted on said control panel base and within said housing, a pressure responsive device mounted on said sub-base, a switching mechanism mounted on said sub-base and actuated by said pressure responsive device, control point adjusting mechanism mounted on said sub-base and having an adjusting member extending through said housing, a control point indicator carried by said sub-base and facing the front of the housing, a second sub-base mounted on said control panel and within said housing, a second pressure responsive device mounted on said second sub-base, switching mechanism mounted on said second sub-base and actuated by said second pressure responsive device, control point adjusting mechanism mounted on said second sub-base and including an adjusting member extending through said housing, a control point indicator carried by said second sub-base and facing the front of the housing, window means on the front of the housing and cooperating with said control point indicators, means associated with the heater for varying the pressure in said pressure responsive devices in accordance with the condition of the heater, said switches controlling the heater.

11. In a control mechanism for controlling a heater, the combination of, a vertical control panel base having a housing therefor, first and second elongated sub-bases mounted on said control panel base and within said housing, said sub-bases extending vertically, separate pressure responsive devices mounted at the lower ends of said sub-bases, separate switches mounted at the upper ends of said sub-bases and actuated by respective pressure responsive devices, one switch moving to closed position upon fall in pressure within its associated pressure responsive device to a predetermined low value and the other switch moving to open position upon rise in pressure within its associated pressure responsive device to a predetermined high value, means associated with the heater for causing the pressure in both of said pressure responsive devices to vary with the condition of the heater, a control point adjustment mechanism associated with each of said sub-bases, each control point adjustment mechanism including an adjusting member extending through the housing and a control point indicating device visible exterior of the housing.

12. In a control mechanism for controlling a heater, the combination of, a control panel base having a housing therefor, first and second sub-bases mounted upon said control panel base and within said housing, each sub-base carrying a pressure responsive device and a switch actuated thereby, one switch moving to closed position upon fall in pressure within its associated pressure responsive device to a predetermined low value and the other switch moving to open position upon rise in pressure within its associated pressure responsive device to a predetermined high value, means associated with the heater for causing the pressure in both of said pressure responsive devices to vary with the condition of the heater, said first switch when closed placing the heater into operation and the second switch when open preventing operation of the heater, a control point adjustment mechanism associated with each of said sub-bases, each control point adjustment mechanism including an adjusting member extending through the housing, and a control point indicating device visible exterior of said housing.

13. In a control mechanism for controlling a heater, the combination of, a control panel base having a housing therefor, a first sub-base mounted on said control panel base and within the housing, a first pressure responsive device mounted on said sub-base, a first switching mechanism mounted on said first sub-base and actuated by said first pressure responsive device, a second sub-base mounted on said control panel base within the housing, said second sub-base supporting a second pressure responsive device and a second switching mechanism actuated thereby, separate control point adjusting mechanisms associated with said sub-bases, each adjusting mechanism including an adjusting member extending through said housing and means visible exterior of the housing for indicating the adjustment thereof, a pair of closed containers associated with said heater, one connected to the first pressure responsive device and the other connected to the second pressure responsive device, thermostatic fills for said pressure responsive devices and associated containers whereby the pressures applied to the pressure responsive devices vary in accordance with the temperature at the heater, said first switching mechanism being closed upon fall in heater temperature to a low value as determined by its control point adjustment and placing the heater into operation and said second switching mechanism being opened upon rise in heater temperature to a high value as determined by its control point adjustment for preventing operation of the heater irrespective of said first switching mechanism, the thermostatic fill for said second pressure responsive device normally operating below atmospheric pressure, whereby upon a leak occurring in said second pressure responsive device or its associated container the second switching mechanism assumes open position for preventing operation of the heater.

14. In a control mechanism for controlling a heater, the combination of, a first pressure responsive device, a first switching mechanism arranged for actuation by said first pressure responsive device, a first closed container associated with the heater and connected to said first pressure responsive device, the first container and pressure responsive device containing a thermostatic medium whereby the pressure applied to the first pressure responsive device varies with the temperature of the heater, first control point adjustment mechanism for adjusting the temperature at which the first switching mechanism is actuated, said first switching mechanism assuming closed position when the temperature of the heater falls to a relatively low value as determined by said adjustment mechanism for placing the heater into operation, a second pressure responsive device, a second switching mechanism arranged for actuation by the second pressure responsive device, a second closed container associated with said heater and connected to said second pressure responsive device, said second pressure responsive device and second container containing a volatile thermostatic medium having a vapor pressure below atmospheric throughout the normal temperature range of the heater, biasing means for biasing the second pressure responsive device toward expanded position, second control point adjustment mechanism for determining the temperature value at which the second switching mechanism is actuated, said second switching mechanism being actuated to open position when the heater temperature rises to a relatively high value as determined by said second adjustment mechanism for preventing operation of the heater irrespective of said first switching mechanism, the sub-atmospheric thermostatic medium providing for a rise in pressure within the second pressure responsive device in case of leakage whereby the biasing means therefor causes opening of the second switching mechanism.

15. In a control mechanism for controlling a heater, the combination of, switching mechanism for placing the heater into or out of operation, a first pressure responsive device arranged for actuating the switching mechanism, a first container associated with the heater and connected to the first pressure responsive device, said first container and pressure responsive device containing a thermostatic medium whereby the pressure applied to the first pressure responsive device varies with the temperature of the heater, said switching mechanism being actuated to place the heater into operation upon fall in temperature of the heater to a relatively low value, control point adjustment mechanism for determining the temperature value at which the heater is placed into operation, a second pressure responsive device arranged for actuating the switching mechanism, a second container associated with the heater and connected to the second pressure responsive device, said second container and second pressure responsive device containing a volatile thermostatic medium having a vapor pressure below atmospheric throughout the normal temperature range of the heater, biasing means for biasing the second pressure responsive device toward expanded position, second control point adjustment mechanism for determining the temperature value at which the second pressure responsive device actuates the switching mechanism, the switching mechanism being actuated to stop the heater irrespective of the first pressure responsive device when the heater temperature rises to a relatively high value as determined by the second control point adjustment mechanism, the sub-atmospheric thermostatic medium providing for a rise in pressure within the second pressure responsive device in case of leakage whereby the biasing means therefor actuates the switching mechanism to prevent operation of the heater.

16. A multiple control mechanism responsive to the temperature of a medium, comprising, a first pressure responsive device, a second pressure responsive device, control mechanism actuated by said pressure responsive devices, a first bulb connected to the first pressure responsive device, a second bulb connected to the second pressure responsive device, a single well member immersed in said medium, and means for supporting both of said bulbs inside of said single well member, said well member having a cylindrical bore therein, said bulbs engaging each other and having curved side walls concentric with and engaging the sides of the cylindrical bore.

17. In a control device, a supporting base, an elongated pivoted operating member carried by the supporting base, a pressure responsive device for rocking said operating member about its pivot, a control device, an actuating member for said control device, a rotatable cam carried at one end of said operating member and disposed perpendicular thereto, the axis of said cam being generally parallel to said operating member, said cam providing a lost motion connection between the operating member and actuating member.

18. In a control device, a supporting base, a pivoted operating member carried by the supporting base, said operating member comprising a first portion generally parallel with the base and a second portion generally perpendicular to the base, condition responsive means, adjustable biasing means, one of said means engaging one of said portions of the operating member and the other of said means engaging the other of said portions of the operating member, a control device carried by the base, an actuating member for said control device disposed generally parallel with the base and having a portion adjacent the second portion of said operating member, and adjustable means carried by said second portion of the operating member for providing an adjustable lost motion connecting means between the operating member and actuating member.

19. In a control device, a supporting base, a generally U-shaped frame member having its leg portions attached to said supporting base and having a front wall portion generally parallel to the base, the base extending beyond said frame member, a control device located on the base beyond the frame member, an actuating lever for the control device pivoted to the legs of the frame member, said actuating lever lying partly within the frame member, a condition responsive device located within the frame member for actuating said lever, control point adjustment means for the condition responsive device, said control point adjustment means comprising an adjusting knob at the end of the frame member remote from the control device, and adjustment indicating means cooperating with the front wall portion of the frame member for indicating the setting of the control point adjustment means.

20. In a control instrument, a supporting base, a bellows mounted on the front of the base adjacent one end thereof and arranged to expand and contract in a direction generally perpendicular to the base, a housing structure extending forwardly from the base, a lever pivotally mounted on the housing structure, control mechanism actuated by said lever, said lever having a first portion extending generally parallel to the base and overlying said bellows, a second portion of said lever extending in a direction substantially perpendicular to the base, a biasing spring for biasing said first portion of the lever against the bellows, said biasing spring extending substantially parallel with the base and having one end attached to the second portion of the lever, an adjusting screw extending through an end of the housing structure in alignment with said spring and arranged to vary the tension thereof, a control point indicator carried by said adjusting screw and extending forwardly from the base, an indicia plate carried by said housing structure, said indicia plate lying in a plane substantially parallel to the plane of the base and cooperating with said indicator for indicating the control point of the instrument, a cover for covering the instrument, said cover having an aperture through which the indicia plate and indicator are visible, and means located on the outside of the cover for manually operating said adjusting screw.

21. In a control mechanism for controlling a heater, the combination of, switching mechanism for placing the heater into or out of operation, a first pressure responsive device arranged for actuating the switching mechanism, a second pressure responsive device arranged for actuating the switching mechanism, container means associated with said heater and connected to said pressure responsive devices, said container means and said pressure responsive devices containing thermostatic medium whereby pressure applied to said pressure responsive devices varies with the temperature of the heater, the first pressure responsive device being arranged to actuate the switching mechanism for placing the heater in operation when the temperature of the heater falls to a predetermined low value, control point adjusting mechanism for determining said low value at which the heater is placed into operation, the second pressure responsive device being arranged to actuate the switching mechanism to place the heater out of operation when the heater temperature rises to a predetermined high value, control point adjusting mechanism for determining the high temperature value at which the heater is placed out of operation by said second pressure responsive device, the switching mechanism when thus actuated by the second pressure responsive device preventing operation of the heater irrespective of the first pressure responsive device, and means for causing at least one of said pressure responsive devices to actuate the switching mechanism to place the heater out of operation irrespective of heater temperature upon the occurrence of leakage of thermostatic medium.

22. In a control mechanism for controlling a heater, the combination of, switching mechanism for placing the heater into or out of operation, pressure responsive means arranged for actuating the switching mechanism, container means associated with the heater and connected to the pressure responsive means, said container means and said pressure responsive means containing a thermostatic medium whereby the pressure applied to the pressure responsive means varies with the temperature of the heater, first actuating means actuated by the pressure responsive means for actuating the switching mechanism to place the heater in operation when the heater temperature falls to a predetermined low value, control point adjusting mechanism for determining the low temperature value at which the heater is placed into operation by said first actuating means, second actuating means actuated by the pressure responsive means for actuating the switching mechanism to stop the burner when the heater temperature rises to a predetermined high value, control point adjusting mechanism for determining the high temperature value at which the heater is placed out of operation by said second actuating means, the switching mechanism when thus actuated by the second actuating means preventing operation of the heater irrespective of said first actuating means, and means for causing said pressure responsive means to actuate the switching mechanism to place the heater out of operation irrespective of heater temperature upon the occurrence of leakage of thermostatic medium.

HOMER E. MALONE.
ARTHUR F. GEISEL.